(12) United States Patent
Kwon et al.

(10) Patent No.: US 10,529,490 B1
(45) Date of Patent: *Jan. 7, 2020

(54) CAPACITOR COMPONENT

(71) Applicant: SAMSUNG ELECTRO-MECHANICS CO., LTD., Suwon-si, Gyeonggi-do (KR)

(72) Inventors: Hyung Soon Kwon, Suwon-si (KR); Kyoung Jin Cha, Suwon-si (KR); Ji Hong Jo, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,556

(22) Filed: Oct. 18, 2018

(30) Foreign Application Priority Data

Aug. 23, 2018 (KR) ........................ 10-2018-0098651

(51) Int. Cl.
*H01G 4/30* (2006.01)
*H01G 4/012* (2006.01)
*H01G 4/232* (2006.01)
*H01G 4/12* (2006.01)
*H01G 4/248* (2006.01)

(52) U.S. Cl.
CPC ............... *H01G 4/30* (2013.01); *H01G 4/012* (2013.01); *H01G 4/232* (2013.01); *H01G 4/1227* (2013.01); *H01G 4/248* (2013.01)

(58) Field of Classification Search
CPC .......... H01G 4/005; H01G 4/012; H01G 4/30
See application file for complete search history.

(56) References Cited

U.S. PATENT DOCUMENTS

| 8,995,109 | B1* | 3/2015 | Tsutsumi | ................ B32B 37/10 |
| | | | | 361/301.4 |
| 2014/0177127 | A1* | 6/2014 | Kim | .................... H01G 4/30 |
| | | | | 361/301.4 |
| 2016/0247632 | A1 | 8/2016 | Tsukida et al. | |
| 2017/0169947 | A1* | 6/2017 | Cha | ..................... H01G 4/008 |
| 2017/0250026 | A1* | 8/2017 | Mizuno | ................ H01G 4/012 |
| 2018/0166217 | A1* | 6/2018 | Kato | ..................... H01G 4/12 |

FOREIGN PATENT DOCUMENTS

| JP | 2003264119 A | * | 9/2003 |
| JP | 2016-157904 A | | 9/2016 |
| KR | 10-1839528 B1 | | 3/2018 |

* cited by examiner

*Primary Examiner* — Eric W Thomas
(74) *Attorney, Agent, or Firm* — Morgan, Lewis & Bockius LLP

(57) ABSTRACT

A capacitor component in which in a cross section (a L-T cross section) of a body in length and thickness directions, a distance between internal electrodes in a central portion of the body is closer than a distance between the internal electrodes in ends of the internal electrodes, and in a cross section (a W-T cross section) of the body in width and thickness directions, a distance between the internal electrodes in a central portion of the body is farther than a distance between the internal electrodes in ends of the internal electrodes may be provided.

12 Claims, 3 Drawing Sheets

CAPACITOR COMPONENT

CROSS-REFERENCE TO RELATED APPLICATION(S)

This application claims the benefit of priority to Korean Patent Application No. 10-2018-0098651 filed on Aug. 23, 2018, in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), a capacitor component, is a chip type condenser mounted on the printed circuit boards of several types of electronic products such as an image display device, including a liquid crystal display (LCD), a plasma display panel (PDP), or the like, a computer, a smartphone, a mobile phone, and the like, serving to charge and discharge electricity.

The multilayer ceramic capacitor as described above may be used as a component in various electronic apparatuses due to advantages thereof such as a small size, high capacitance, and ease of mountability. In accordance with miniaturization and high output of various electronic devices such as computers, mobile devices, and the like, demand for miniaturization and high capacitance in multilayer ceramic capacitors has increased.

In order to simultaneously achieve miniaturization and high capacitance in a multilayer ceramic capacitor, there is a need to decrease thicknesses of dielectric layers and internal electrodes to increase the number of stacked dielectric layers and internal electrodes. Currently, the thickness of a dielectric layer has reached about 0.6 µm, and has been continuously thinned.

However, when the dielectric layer is formed to have a thickness less than 0.6 µm, it may be difficult to secure withstand voltage characteristics, and a defect caused by insulation resistance (IR) deterioration of the dielectric layer may be increased, such that quality, a yield, and the like, may be deteriorated.

SUMMARY

An aspect of the present disclosure may provide a capacitor component having excellent withstand voltage characteristics.

According to an aspect of the present disclosure, a capacitor component may include: a body including dielectric layers and first and second internal electrodes alternately disposed with respective dielectric layers interposed therebetween and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes disposed on the third and fourth surfaces, respectively, wherein the first internal electrode is spaced apart from the fourth surface and exposed to the third surface, the second internal electrode is spaced apart from the third surface and exposed to the fourth surface, in a cross section of the body in the first and second directions, $l2/l1>1$, where $l1$ is a distance between the first and second internal electrodes adjacent to each other in a central portion of the body in the second direction and $l2$ is a distance between a first end of the first internal electrode spaced apart from the fourth surface and the second internal electrode adjacent to the first end or a distance between a second end of the second internal electrode spaced apart from the third surface and the first internal electrode adjacent to the second end, and in a cross section of the body in the first and third directions, $l4/l3 \leq 0.99$, where $l3$ is a distance between the first and second internal electrodes adjacent to each other in a central portion of the body in the third direction and $l4$ is a distance between first and second internal electrodes in both ends of the first and second internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
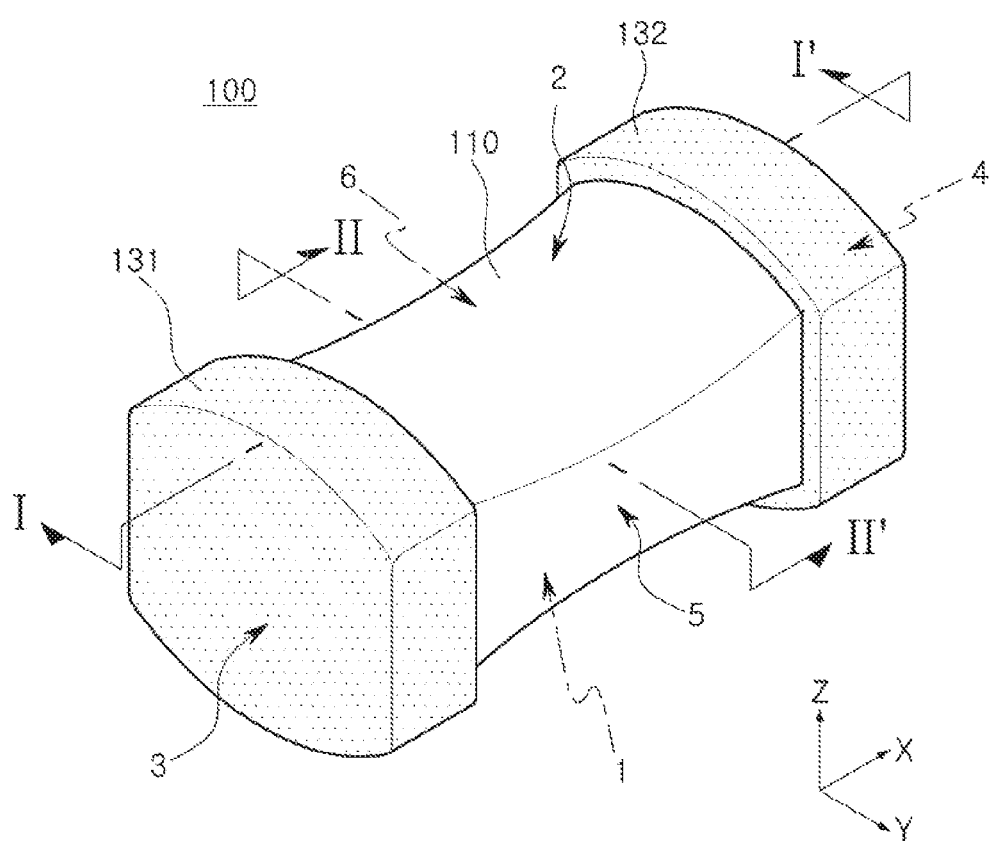
FIG. 1 is a perspective view schematically illustrating a capacitor component according to an exemplary embodiment in the present disclosure.

Hereinafter, exemplary embodiments of the present disclosure will now be described in detail with reference to the accompanying drawings. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including a physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. In addition, a vertical direction refers to the abovementioned upward and downward directions, and a horizontal direction refers to a direction perpendicular to the abovementioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

In the accompanying drawings, an X direction refers to a second direction, an L direction, or a length direction, a Y direction refers to a third direction, a W direction or a width direction, and a Z direction refers to a first direction, a stacking direction, a T direction, or a thickness direction.

Capacitor Component

FIG. 1 is a perspective view schematically illustrating a capacitor component according to an exemplary embodiment in the present disclosure.

Figure 2:
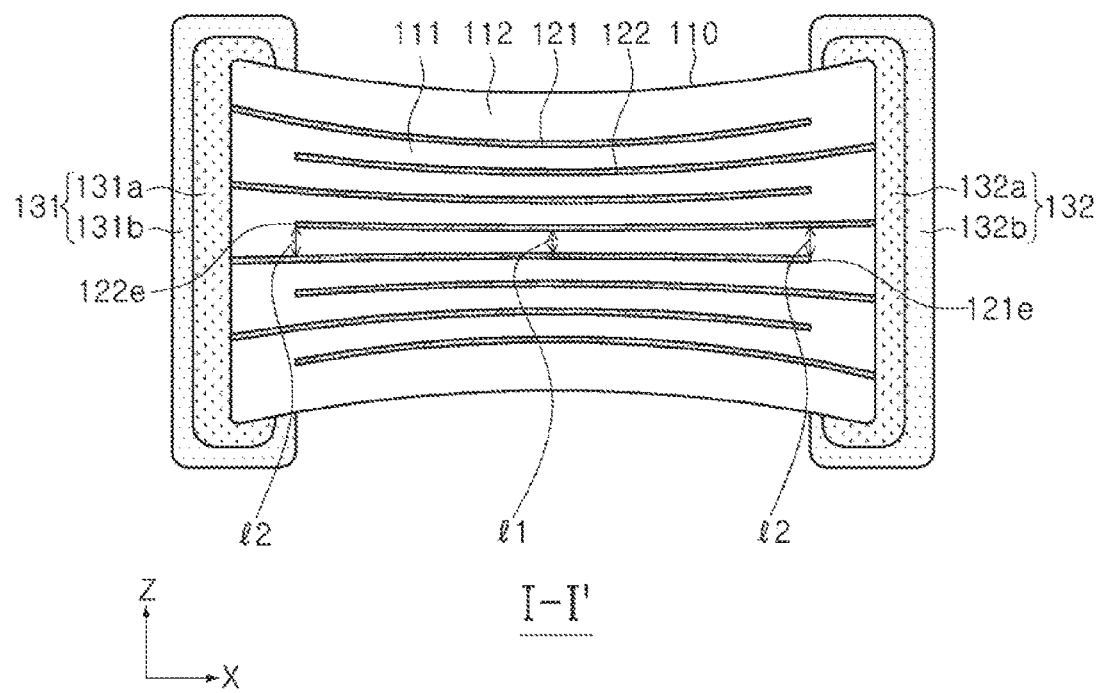
FIG. 2 is a cross-sectional view taken along line I-I' of FIG. 1.

FIG. 2 is a cross-sectional view taken along line I-I' of FIG. 1.

Figure 3:
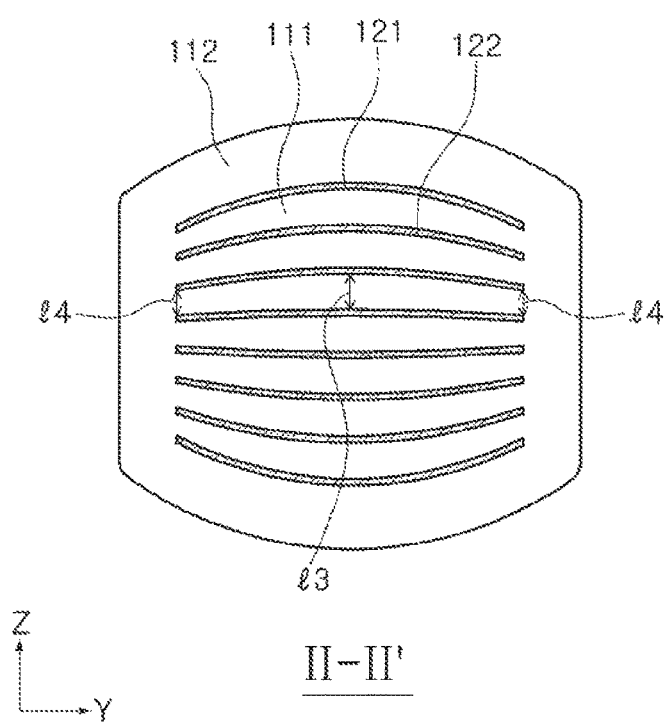
FIG. 3 is a cross-sectional view taken along line II-II' of FIG. 1.

FIG. 3 is a cross-sectional view taken along line II-II' of FIG. 1.

Figure 4A:
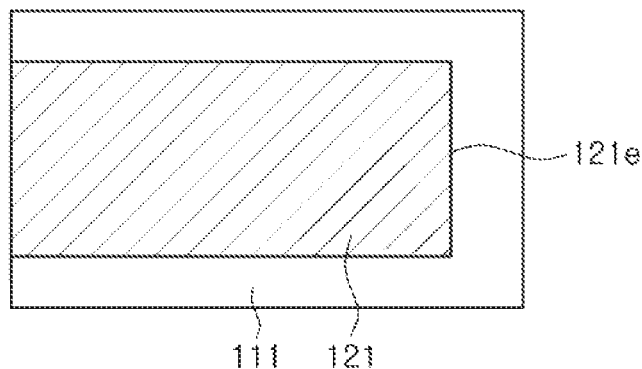
FIGS. 4A and 4B illustrate ceramic green sheets on which an internal electrode is printed, used to manufacture the capacitor component according to the exemplary embodiment in the present disclosure.
Figure 4B:
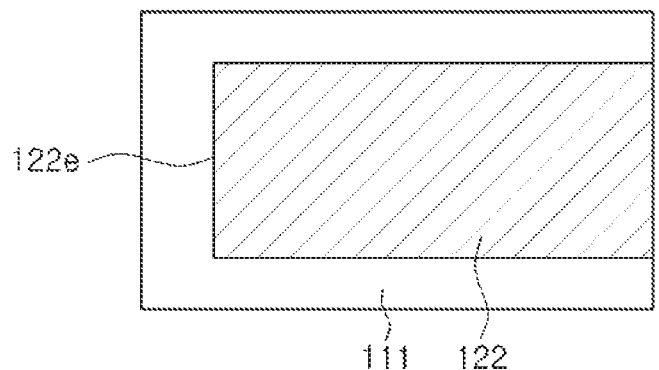

FIGS. 4A and 4B illustrate ceramic green sheets on which an internal electrode is printed, used to manufacture the capacitor component according to the exemplary embodiment in the present disclosure.

Referring to FIGS. 1 through 4B, a capacitor component 100 according to the exemplary embodiment in the present disclosure may include: a body 110 including dielectric layers 111 and first and second internal electrodes 121 and 122 alternately disposed with respective dielectric layers interposed therebetween and having first and second surfaces 1 and 2 opposing each other in the first (Z) direction, third and fourth surfaces 3 and 4 connected to the first and second surfaces and opposing each other in the second (X) direction, and fifth and sixth surfaces 5 and 6 connected to the first to fourth surfaces and opposing each other in the third (Y) direction; and first and second external electrodes 131 and 132 disposed on the third and fourth surfaces, respectively, wherein the first internal electrode 121 is spaced apart from the fourth surface and exposed to the third surface, the second internal electrode 122 is spaced apart from the third surface and exposed to the fourth surface, in a cross section of the body 110 in the first and second directions, l2/l1>1, where l1 is a distance between the first and second internal electrodes adjacent to each other in a central portion of the body in the second direction and l2 is a distance between a first end of the first internal electrode spaced apart from the fourth surface and the second internal electrode adjacent to the first end or a distance between a second end of the second internal electrode spaced apart from the third surface and the first internal electrode adjacent to the second end, and in a cross section of the body in the first and third directions, l4/l3≤0.99, where l3 is a distance between the first and second internal electrodes adjacent to each other in a central portion of the body in the third direction and l4 is a distance between the first and second internal electrodes in both ends of the first and second internal electrodes.

In the body 110, the dielectric layers 111 and the internal electrodes 121 and 122 may be alternately stacked.

A specific shape of the body 110 is not particularly limited, but the body 110 may have a hexahedral shape or a shape similar thereto as illustrated in the accompanying drawings. Although the body 110 may not have a hexahedral shape having a perfectly straight line due to shrinkage of ceramic powder particles contained in the body 110 at the time of sintering, the body 110 may have a substantially hexahedral shape.

The body 110 may have the first and second surfaces 1 and 2 opposing each other in the thickness (Z) direction, the third and fourth surfaces 3 and 4 connected to the first and second surfaces 1 and 2 and opposing each other in the length (X) direction, and the fifth and sixth surfaces 5 and 6 connected to the first and second surfaces 1 and 2 and the third and fourth surfaces 3 and 4 and opposing each other in the width (Y) direction.

The plurality of dielectric layers 111 forming the body 110 may be in a sintered state, and adjacent dielectric layers 111 may be integrated with each other so that boundaries therebetween are not readily apparent without using a scanning electron microscope (SEM).

A raw material of the dielectric layer 111 is not particularly limited as long as sufficient capacitance may be obtained. For example, the raw material of the dielectric layer 111 may be a barium titanate ($BaTiO_3$) powder. A material of the dielectric layer 111 may be prepared by adding various ceramic additives, an organic solvent, a plasticizer, a binder, a dispersing agent, and the like, to a powder such as the barium titanate ($BaTiO_3$) powder, or the like, depending on an object of the present disclosure.

Upper and lower portions of the body 110, that is, both end portions of the body 110 in the thickness (Z) direction may include cover layers 112 formed by stacking dielectric layers on which the internal electrode is not formed, respectively. The cover layer 112 may serve to maintain reliability of a capacitor against external impacts.

A thickness of the cover layer 112 is not particularly limited. However, in order to more easily achieve miniaturization and high capacitance of the capacitor component, the thickness of the cover layer 112 may be 20 μm or less.

Next, the internal electrodes 121 and 122 may be alternately stacked with each of the dielectric layers interposed therebetween, and include the first and second internal electrodes 121 and 122. The first and second internal electrodes 121 and 122 may be disposed to face each other with each of the dielectric layers 111 interposed therebetween and constituting the body 110, and exposed to the third and fourth surfaces 3 and 4 of the body 110, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4.

Here, the first and second internal electrodes 121 and 122 may be electrically separated from each other by the dielectric layer 111 disposed therebetween. Referring to FIGS. 4A and 4B, the body 110 may be formed by alternately stacking a ceramic green sheet a on which the first internal electrode 121 is printed and a ceramic green sheet b on which the second internal electrode 122 is printed and then sintering the stacked ceramic green sheets a and b.

A material forming the first and second internal electrodes 121 and 122 is not particularly limited, but may be a conductive paste formed of at least one selected from the group consisting of, for example, a noble metal material such as palladium (Pd), a palladium-silver (Pd—Ag) alloy, or the like, nickel (Ni), and copper (Cu).

A method of printing the conductive paste may be a screen printing method, a gravure printing method, or the like, but is not limited thereto.

Referring to FIG. 2, at the time of observing the cross section (the L-T cross section) of the body 110 in the first and second directions, the capacitor component according to the exemplary embodiment in the present disclosure may satisfy l2/l1>1, where l1 is a distance between the first and second internal electrodes 121 and 122 adjacent to each other in a central portion of the body 110 in the second direction and l2 is a distance between a first end 121e of the first internal electrode spaced apart from the fourth surface and the second internal electrode 122 adjacent to the first end or a distance between a second end 122e of the second internal electrode spaced apart from the third surface and the first internal electrode 121 adjacent to the second end.

In order to simultaneously achieve miniaturization and high capacitance of the multilayer ceramic capacitor, there is a need to decrease thicknesses of dielectric layers and internal electrodes to increase the number of stacked dielectric layers and internal electrodes. Currently, the thickness of the dielectric layer reached about 0.6 μm, and has been continuously thinned.

However, when the dielectric layer is formed to have a thickness less than 0.6 μm, it may be difficult to secure withstand voltage characteristics, and a defect caused by insulation resistance (IR) deterioration may be increased, such that quality, a yield, and the like may be decreased.

Particularly, because in the cross-section (the L-T cross section) of the body 110 in the first and second directions, a large number of process defects such as a stacking step, and the like, may be included in an outer side portion of the body 110 rather than the central portion of the body 110 in the second direction, a problem in which a withstand voltage is decreased may frequently occur in the outer side portion of the body 110.

Here, the outer side portion of the body 110 in the second direction may mean a portion in which the first end 121e of the first internal electrode spaced apart from the fourth surface and the second end 122e of the second internal electrode spaced apart from the third surface are positioned in the cross-section (the L-T cross section) of the body 110 in the first and second directions.

When the capacitor component according to the present disclosure satisfies l2/l1>1, since a thickness of the dielectric layer in the outer side portion of the body 110 in the second direction may be thicker than that of the dielectric layer in the central portion of the body 110 in the second direction, withstand voltage characteristics may be improved.

A method of allowing the capacitor component to satisfy l2/l1>1 is not particularly limited. For example, a method of promoting grain growth of the dielectric layer in the outer side portion of the body 110 in the second direction by controlling sintering conditions may be used.

Here, l2/l1 may satisfy 1.05≥l2/l1>1.

When l2/l1 is 1 or less, it may be difficult to improve withstand voltage characteristics, and when l2/l1 is more than 1.05, since the thickness of the dielectric layer in the outer side portion of the body 110 in the second direction may be excessively thick as compared to the central portion of the body 110 in the second direction, such that a shape of the capacitor component may be excessively deformed, and thus it may be difficult to maintain a shape of the capacitor component.

Referring to FIG. 3, in the cross section (the W-T cross section) of the body 110 in the first and third directions, the capacitor component according to the exemplary embodiment in the present disclosure may satisfy l4/l3≤0.99, where l3 is a distance between the first and second internal electrodes adjacent to each other in the central portion of the body 110 in the third direction and l4 is a distance between the first and second internal electrodes in both ends of the first and second internal electrodes.

That is, in the cross section (the W-T cross section) of the body 110 in the first and third directions, a thickness of the dielectric layer in the central portion of the body 110 in the third direction may be thicker than that of the dielectric layer in an outer side portion of the body 110 in the third direction.

Here, the outer side portion of the body 110 in the third direction may mean a portion in which both ends of the first and second internal electrodes are positioned at the time of observing the cross section (the W-T cross section) of the body 110 in the first and third directions.

When the thickness of the dielectric layer in the outer side portion of the body 110 in the third direction is also increased in the cross section (the W-T cross section) of the body 110 in the first and third directions in a state, where l2/l1>1 is satisfied, since the shape of the capacitor component is highly likely to be deformed, in order to improve withstand voltage characteristics while maintaining the shape of the capacitor component, there is a need to satisfy l4/l3≤0.99.

That is, in a case of increasing the thickness of the dielectric layer in both the outer side portion of the body 110 in the second direction and the outer side portion of the body 110 in the third direction, it may be difficult to maintain the shape of the capacitor component. Therefore, in order to improve withstand voltage characteristics while maintaining the shape of the capacitor component, there is a need to satisfy l4/l3≤0.99.

Here, l4/l3 may satisfy 0.95≤l4/l3≤0.99.

When l4/l3 is more than 0.99, the shape of the capacitor component is highly likely to be deformed as described above, and when l4/l3 is less than 0.95, the thickness of the dielectric layer in the outer side portion of the body 110 in the third direction may be excessively thin, an effect of improving withstand voltage characteristics obtained by allowing the capacitor component to satisfy l2/l1>1 may be deteriorated.

Further, the shape of the capacitor component may be maintained and at the same time, withstand voltage characteristics may be improved by allowing l2/l1 to satisfy 1.05≥l2/l1>1 and allowing l4/l3 to satisfy 0.95≤l4/l3≤0.99.

Meanwhile, a thickness of the first and second internal electrodes 121 and 122 is not particularly limited. However, in order to more easily achieve miniaturization and high capacitance of the capacitor component, the thickness of the first and second internal electrodes 121 and 122 may be 0.4 μm or less.

The thickness of the first and second internal electrodes 121 and 122 may mean an average thickness of the first and second internal electrodes 121 and 122.

The average thickness of the first and second internal electrodes 121 and 122 may be measured from an image obtained by scanning the cross section (the L-T cross section) of the body 110 in the length and thickness directions using a scanning electron microscope (SEM).

For example, with respect to first and second internal electrodes 121 and 122 randomly extracted from an image obtained by scanning the cross section (the L-T cross section) of the body 110 cut in the length and thickness directions in the central portion of the body 110 in the width (W) direction using the scanning electron microscope (SEM), thicknesses of the first and second internal electrodes may be measured at thirty points disposed at equal intervals in the length direction to measure an average value thereof.

The thirty points disposed at equal intervals may be measured in a capacitance forming portion that means a region in which the first and second internal electrodes 121 and 122 overlap with each other.

Further, there is no need to particularly limit the thickness of the dielectric layer 111.

However, when the dielectric layer is formed to have a thin thickness of less than 0.6 μm, particularly, when a thickness td of the dielectric layer is 0.4 μm or less, since the number of dielectric grains capable of existing in each dielectric layer is restricted, it may be difficult to secure withstand voltage characteristics, and a defect caused by insulation resistance (IR) deterioration of the dielectric layer may be increased, such that quality, a yield, and the like, may be deteriorated.

As described above, when l2/l1>1 and l4/l3≤0.99 are satisfied according to the exemplary embodiment in the present disclosure, withstand voltage characteristics of the capacitor component may be improved, and since breakdown voltage (BDV) characteristics and reliability may be improved, even in a case in which the thickness td of the dielectric layer is 0.4 μm or less, sufficient withstand voltage characteristics may be secured.

Therefore, in the case in which the thickness td of the dielectric layer 111 is 0.4 μm or less, the effect of improving withstand voltage characteristics, the breakdown voltage (BDV) characteristics, and reliability may be more significantly increased.

The thickness of the dielectric layer 111 may mean an average thickness of the dielectric layers 111 disposed between the first and second internal electrodes 121 and 122.

The average thickness of the dielectric layers 111 may be measured from the image obtained by scanning the cross section (the L-T cross section) of the body 110 in the length and thickness directions using a scanning electron microscope (SEM).

For example, with respect to dielectric layers randomly extracted from the image obtained by scanning the cross section (the L-T cross section) of the body 110 cut in the length and thickness directions at the central portion of the body 110 in the width direction using the scanning electron microscope (SEM), thicknesses of the dielectrics may be measured at thirty points disposed at equal intervals in the length direction to measure an average value thereof.

The thirty points disposed at equal intervals may be measured in a capacitance forming portion, the region in which the first and second internal electrodes 121 and 122 overlap with each other.

The external electrodes 131 and 132 may be disposed on the body 110 and connected to the internal electrodes 121 and 122, respectively. As illustrated in FIG. 2, the capacitor component 100 may include first and second external electrodes 131 and 132 connected to the first and second internal electrodes 121 and 122, respectively. Although a structure in which the capacitor component 100 includes two external electrodes 131 and 132 is described in the present exemplary embodiment, the number, shape, and the like, of external electrodes 131 and 132 may be changed depending on shapes of the internal electrodes 121 and 122 or other purposes.

Meanwhile, the external electrodes 131 and 132 may be formed of any material as long as it has electrical conductivity. A specific material of the external electrodes 131 and 132 may be determined in consideration of electrical properties, structural stability, and the like. Further, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132b, respectively.

More specifically, the electrode layers 131a and 132a may be, for example, sintered electrodes containing a conductive metal and glass, wherein the conductive metal may be copper (Cu). Further, the electrode layers 131a and 132a may be resin-based electrodes containing a plurality of metal particles and a conductive resin.

More specifically, the plating layers 131b and 132b may be, for example, Ni plating layers or Sn plating layers. The plating layers 131b and 132b may also include Ni plating layers and Sn plating layers sequentially formed on the electrode layers 131a and 132a, respectively, or include a plurality of Ni plating layers and/or a plurality of Sn plating layers.

Meanwhile, a size of the capacitor component 100 is not particularly limited.

However, since there is a need to decrease the thicknesses of the dielectric layers and the internal electrodes to increase the number of stacked dielectric layers and internal electrodes in order to simultaneously achieve miniaturization and high capacitance, the effect of improving withstand voltage characteristics, the breakdown voltage (BDV) characteristics, and reliability may be more significantly increased in a capacitor component having a 0402 (0.4 mm×0.2 mm) size or less.

Therefore, when a length of the capacitor component in the first direction is defined as a thickness of the capacitor component, and a length of the capacitor component in the second direction is defined as a length of the capacitor component, the length of the capacitor component may be 0.4 mm or less, and the thickness of the capacitor component may be 0.2 mm or less.

That is, the capacitor component may be the capacitor component having a 0402 (0.4 mm×0.2 mm) size or less.

As set forth above, according to exemplary embodiments in the present disclosure, the capacitor component having excellent withstand voltage characteristic may be provided.

While exemplary embodiments have been shown and described above, it will be apparent to those skilled in the art that modifications and variations could be made without departing from the scope of the present invention as defined by the appended claims.

What is claimed is:

1. A capacitor component comprising:
   a body including dielectric layers and first and second internal electrodes alternately disposed with respective dielectric layers interposed therebetween and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes disposed on the third and fourth surfaces, respectively, wherein the first internal electrode is spaced apart from the fourth surface and exposed to the third surface, the second internal electrode is spaced apart from the third surface and exposed to the fourth surface, in a cross section of the body in the first and second directions, l2/l1>1, where l1 is a distance between the first and second internal electrodes adjacent to each other in a central portion of the body in the second direction and l2 is a distance between a first end of the first internal electrode spaced apart from the fourth surface and the second internal electrode adjacent to the first end or a distance between a second end of the second internal electrode spaced apart from the third surface and the first internal electrode adjacent to the second end, and in a cross section of the body in the first and third directions, l4/l3≤0.99, where l3 is a distance between the first and second internal electrodes adjacent to each other in a central portion of the body in the third direction and l4 is a distance between the first and second internal electrodes in both ends of the first and second internal electrodes.

2. The capacitor component of claim 1, wherein l2/l1 satisfies 1.05≥l2/l1>1, and l4/l3 satisfies 0.95≤l4/l3≤0.99.

3. The capacitor component of claim 1, wherein an average thickness of the dielectric layers is 0.4 μm or less.

4. The capacitor component of claim 1, wherein an average thickness of the first and second internal electrodes is 0.4 μm or less.

5. The capacitor component of claim 1, wherein an average thickness of the dielectric layers is 0.4 μm or less and an average thickness of the first and second internal electrodes is 0.4 μm or less.

6. The capacitor component of claim 1, wherein a cover portion including the dielectric layer is disposed in both end portions of the body in the first direction, and a thickness of the cover portion is 20 μm or less.

7. The capacitor component of claim 1, wherein a length of the capacitor component corresponding to a length of the capacitor component in the second direction is 0.4 mm or less, and a thickness of the capacitor component corresponding to a length of the capacitor component in the first direction is 0.2 mm or less.

8. A capacitor component comprising:

a body having first and second surfaces opposing each other in the thickness direction, third and fourth surfaces opposing each other in a length direction, and fifth and sixth surfaces opposing each other in a width direction, the third and fourth surfaces connecting the first and second surfaces, and the fifth and sixth surfaces connecting the first and second, and the third and fourth surfaces;

first internal electrodes exposed to the third surface and spaced apart from the fourth surface, and second internal electrodes exposed to fourth surface and spaced apart third surface, the first and second internal electrodes being disposed inside the body, each pair of the first and second internal electrodes being separated by a dielectric layer such that:

in a length-thickness cross-section, a ratio of a distance (l2) between the pair at an end portion in the length direction to a distance (l1) between the pair at a central portion is greater than one, and in a width-thickness cross-section, a ratio of a distance (l4) between the pair at an end portion in the width direction to a distance (l3) between the pair at a central portion is less than or equal to 0.99.

9. The capacitor component of claim 8, further comprising a first external electrode disposed on the third surface and connected to the first internal electrodes, and a second external electrode disposed on the fourth surface and connected to the second internal electrodes.

10. The capacitor component of claim 8, wherein an average thickness of the dielectric layers is 0.4 μm or less and an average thickness of the first and second internal electrodes is 0.4 μm or less.

11. The capacitor component of claim 8, wherein l2/l1 satisfies 1.05≥l2/l1>1, and l4/l3 satisfies 0.95≤l4/l3≤0.99.

12. The capacitor component of claim 8, further comprising a cover portion disposed in both end portions of the body in the thickness direction, and a thickness of the cover portion is 20 μm or less.

* * * * *